United States Patent
Vezzini et al.

(10) Patent No.: US 8,120,321 B2
(45) Date of Patent: Feb. 21, 2012

(54) DEVICE FOR IMPROVING THE CHARGING OR DISCHARGING PROCESS OF A BATTERY

(75) Inventors: Andrea Vezzini, Merzligen (CH); Stefan Bronnimann, Biel (CH)

(73) Assignee: Berner Fachhochschule, Technik und Informatik, Biel (CH)

( * ) Notice: Subject to any disclaimer, the term of this patent is extended or adjusted under 35 U.S.C. 154(b) by 697 days.

(21) Appl. No.: 12/161,872

(22) PCT Filed: Jan. 26, 2007

(86) PCT No.: PCT/CH2007/000034
§ 371 (c)(1),
(2), (4) Date: Jul. 23, 2008

(87) PCT Pub. No.: WO2007/085105
PCT Pub. Date: Aug. 2, 2007

(65) Prior Publication Data
US 2009/0027006 A1    Jan. 29, 2009

(30) Foreign Application Priority Data
Jan. 27, 2006  (EP) .................................. 06405038

(51) Int. Cl.
*H02J 7/00* (2006.01)
*H02J 1/00* (2006.01)
*H02J 3/00* (2006.01)

(52) U.S. Cl. ........ 320/118; 320/122; 320/124; 320/127; 320/128; 307/66; 307/72; 307/75

(58) Field of Classification Search ............... 320/118
See application file for complete search history.

(56) References Cited

U.S. PATENT DOCUMENTS

| | | | |
|---|---|---|---|
| 5,644,212 A | 7/1997 | Takahashi | |
| 5,920,179 A * | 7/1999 | Pedicini | 320/122 |
| 5,952,815 A * | 9/1999 | Rouillard et al. | 320/116 |
| 6,114,835 A | 9/2000 | Price | |
| 6,417,646 B1 * | 7/2002 | Huykman et al. | 320/122 |
| 6,661,203 B2 * | 12/2003 | Wolin et al. | 320/134 |
| 6,750,631 B2 * | 6/2004 | Perelle | 320/116 |
| 7,443,139 B2 | 10/2008 | Mitsui et al. | |
| 2003/0146737 A1 | 8/2003 | Kadouchi et al. | |
| 2004/0251874 A1 | 12/2004 | Petitdidier | |
| 2005/0140335 A1 | 6/2005 | Lee et al. | |

FOREIGN PATENT DOCUMENTS
EP    1548453 A1    6/2005

* cited by examiner

*Primary Examiner* — Yalkew Fantu
(74) *Attorney, Agent, or Firm* — The Webb Law Firm

(57) ABSTRACT

A device for balancing a plurality of at least two batteries or cells of a multicell battery comprises a multicell battery and a battery management system with a balancing circuit. Thereby all individual battery cells are connected to the battery monitoring system, wherein the battery monitoring system measures single cell voltage as well as the battery temperature and the current. The battery monitoring system is able to discern the lowest cell voltage and to discern a number of cells having a voltage higher than a determined maximum allowable voltage, which will be balanced until the charge imbalance decreases to an acceptable amount. The battery management system is active during charging and discharging of the multicell battery and the thresholds vary with the state of the battery.

7 Claims, 3 Drawing Sheets

DEVICE FOR IMPROVING THE CHARGING OR DISCHARGING PROCESS OF A BATTERY

BACKGROUND OF THE INVENTION

1. Field of the Invention

The present invention relates to a device to improve the charging or discharging process of a battery, to increase the usable capacity and the usable lifetime (number of cycles) of a battery.

2. Description of Related Art

Using balancing for charging/discharging batteries is known from prior art.

U.S. Pat. No. 6,114,835 for example discloses a balancing circuit that incorporates a voltage threshold which determines when to initiate a charge balance mode in order to equalize the level of charge in at least two cells of a multi-cell battery pack. Thereby balancing is initiated when the voltage level of a first cell reaches a first threshold voltage and balancing is stopped, when reaching a second threshold voltage. Balancing is used during charging a battery to balance the charge between cells. This can be done using passive balance circuits or active balance circuits. Normally the balancing method/balancing procedure is started at the end of charging, when one or more of the cells reach prematurely the end of charge voltage or during charging, when one cell voltage reaches a predefined fixed threshold. Then the balance circuit will equalize the charge of this cell compared to at least one of the other cells.

It is a drawback of this device that balancing is only applied between two specific thresholds and that it is only applicable for charging a battery. Furthermore the equalization takes a long time since the threshold is fixed at a certain value.

Patent application US2005/0140335 discloses a terminal voltage equalization circuit to equalize the terminal voltage of a series of connected battery strings. This patent application states that the charging current of the higher charge cells is reduced and the lower charged cells are equalized, making it therefore clear, that they use their concept during charge only. It is a further drawback that balancing is used on certain time intervals only.

According to prior art there are several methods and devices known to determine the state of health or the age of a battery. The internal battery resistance for example is a very good indicator for the state of health (or age) of the battery. Common methods for the internal resistance measurement are either the AC Impedance measurement, where a medium to high frequency signal is used to measure the impedance or the DC Resistance measurement, where with an additional circuit a DC current is used to measure the voltage drop and calculate the DC resistance. The latter is used off-line, meaning, that when the battery is not used, the cell is discharged with a constant current and the voltage drop is measured. To get an accurate reading the discharge current has to be in the order of half or full nominal battery current. This is not an energy problem as the pulses are quite short, but the measurement current has to be switched on (needs large semiconductor switch).

SUMMARY OF THE INVENTION

An object of the present invention is to provide a device for monitoring a battery comprising two or more cells in series and to keep the charge imbalance between the cells within a narrow band using a balanced scheme that does not have the disadvantages of prior art as already mentioned.

It is another object of the invention to provide a method and a device that is able to reach a full charge of a battery in a shorter time than methods and device of prior art.

According to invention there is provided a device for balancing a plurality of at least two batteries or cells of a multi-cell battery comprising a multicell battery and a battery management system with a balancing circuit. The device is characterized in that all individual battery cells are connected to a battery monitoring system, wherein the monitoring system measures every single cell voltage as well as the battery temperature and the current. The said battery monitoring system is able to discern a charge imbalance between the cells of a multicell battery (e.g. discern the lowest cell voltage or when the voltage of one or several cells is below the average voltage of all or when one or more cells are outside a statistical tolerance band given by the standard deviation) and to discern a number of cells having a voltage higher than a determined maximum allowable voltage, which will be balanced until the charge imbalance decreases to an acceptable amount. The battery management system is active during charging and discharging of said multicell battery, wherein the thresholds vary with the state of the battery. These measurement values are used for various calculations described below.

The balancing method is applicable on the directly measured cell voltages as well as on the corrected cell voltages according to the method. The advantage of using the corrected voltages is that these voltages are equivalent to the charge of the specific cell whereas the uncorrected values are influenced by the current and the temperature and the age of the battery, which may lead to unintentional balancing of certain cells with an internal resistance that differs from the average internal resistance inside the battery pack. This leads to a more efficient balancing, especially for batteries with a higher number of cells in series.

The battery monitoring system of the device effectively monitors all individual cells continuously or intermittently. If inconspicuous cells are checked, the battery monitoring system can store a value stating that the voltage of a given cell is far away from, i.e. lower than, the upper threshold and is also in its voltage quite higher than the lowest voltage in question. Such cells can then be omitted in a continuously running check and can be checked intermittently with a lower frequency. Such cells will then be reallocated to the usual check frequency, if their values approach the given limits.

BRIEF DESCRIPTION OF THE DRAWINGS

The drawings will be explained in greater detail by means of a description of an exemplary embodiment, with reference to the following figures.

DETAILED DESCRIPTION OF THE PREFERRED EMBODIMENTS

Figure 1:
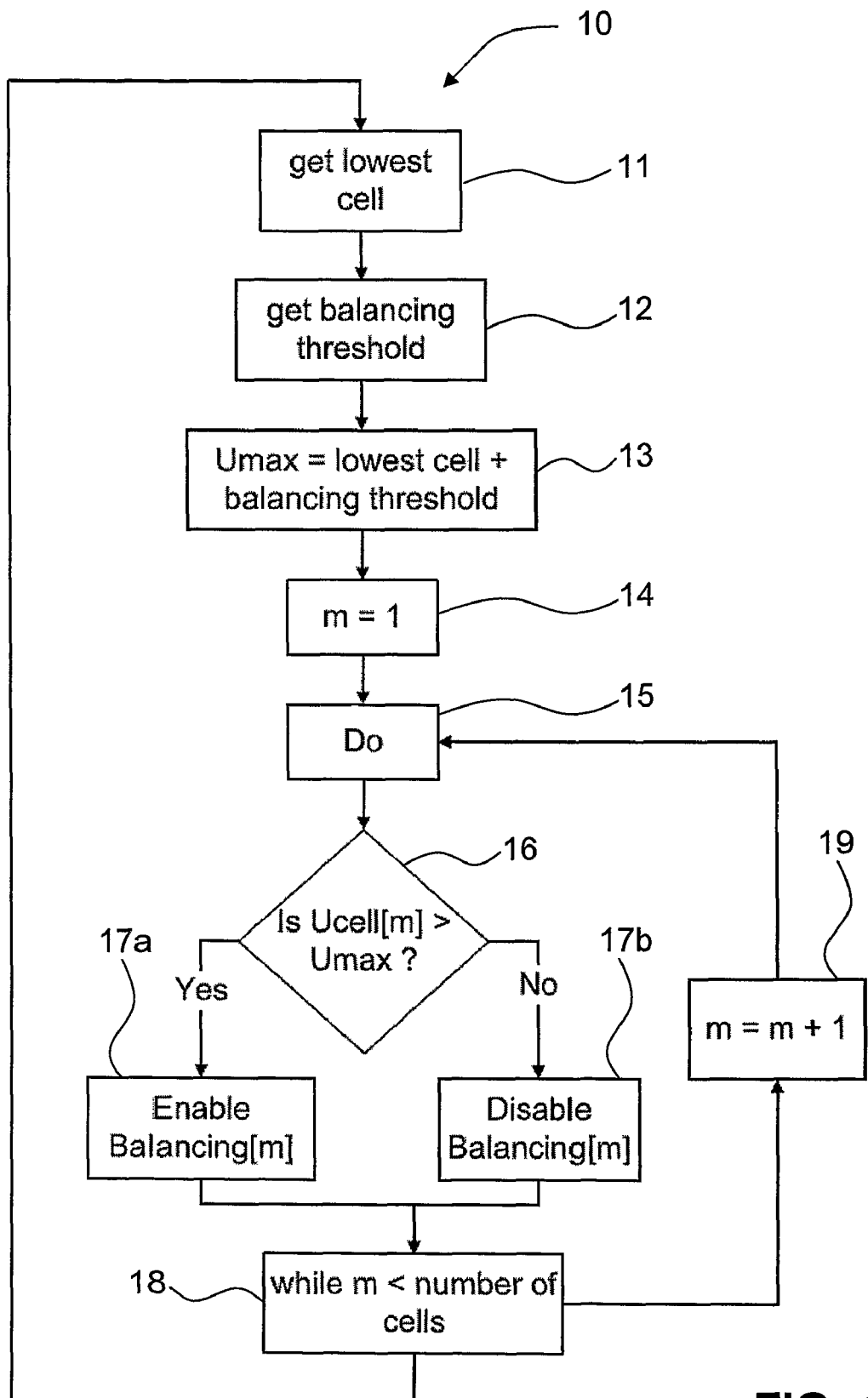
FIG. 1 shows a flowchart for a balancing method according to the present invention.
Figure 2:
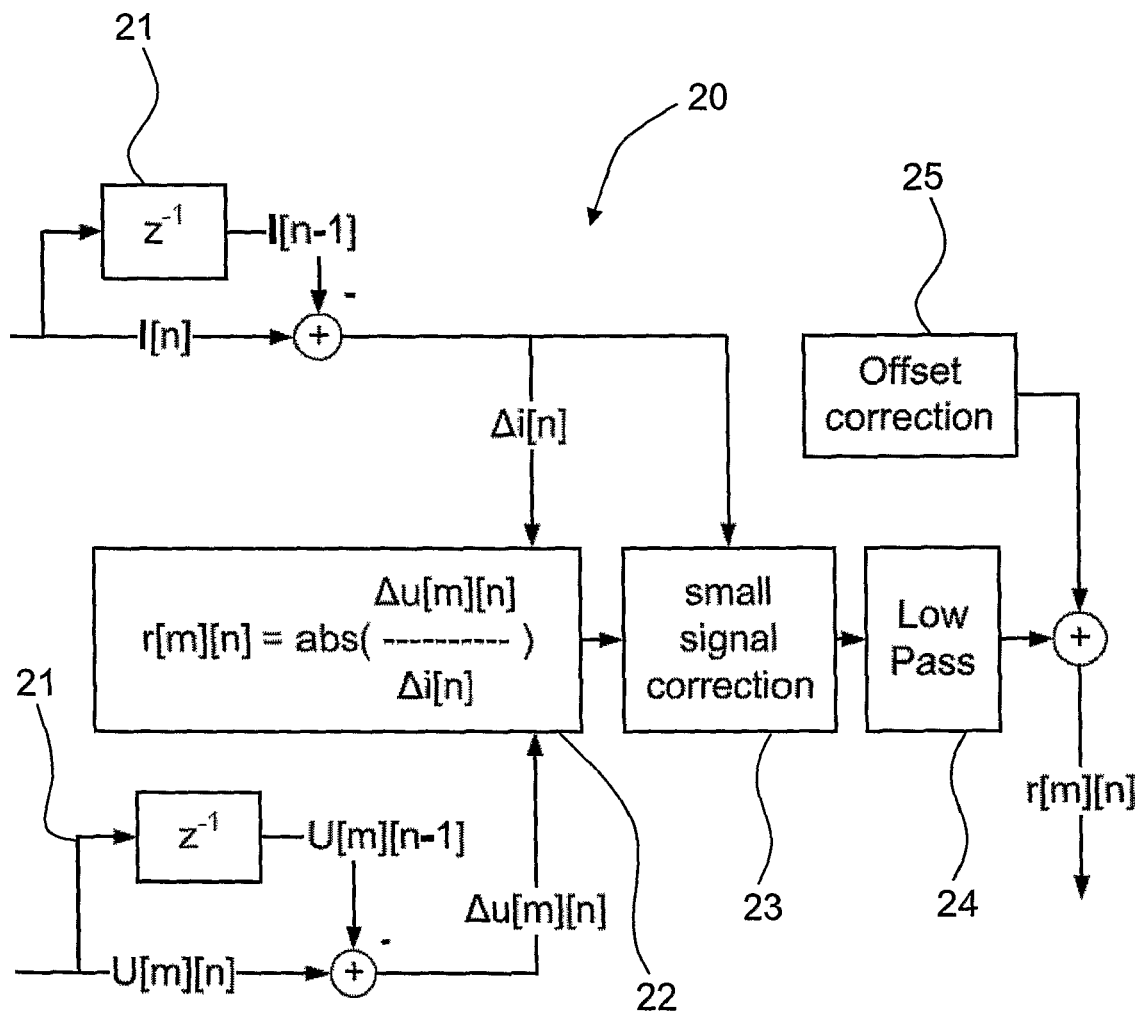
FIG. 2 shows an arrangement of an online internal resistance measurement according to the present invention.
Figure 3:
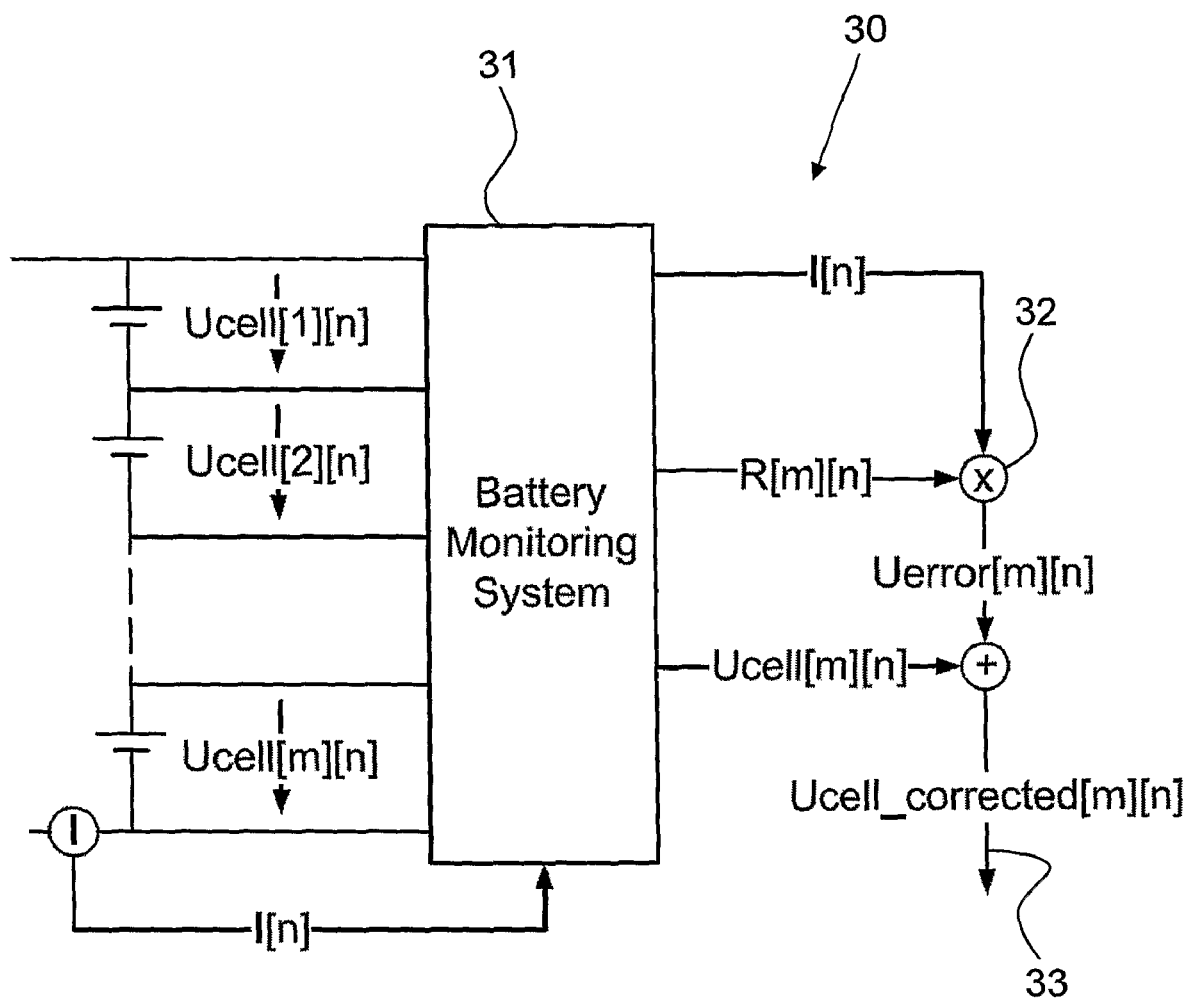
FIG. 3 shows an arrangement of a device for cell voltage correction according to the present invention.

By means of the FIGS. 1 to 3 there is explained a preferred embodiment of the present invention, which is a monitoring and balancing device for multicell batteries. Very good results were achieved with a higher number of cells, where the probability of an imbalance of the cell charge is higher and an increase over time as some cells have either a lower quality or are differently exposed to the environment and the aging process is therefore faster. Such a multicell structure battery may be a lithium-ion, lithium polymer or any other energy storage cell that should be kept within certain charge operating limits or as an indicator operating limits. For the sake of simplicity, the term battery refers to such multicell structure batteries. Such batteries may be used in automotive applications (e.g. Hybrid-cars, fuel-cell cars, EV-cars, utility vehicles, scooters, e-bikes and the like), in mobile power supply applications (e.g. power tools, portable computers, embedded computers, medical equipment), household and industrial power backup supplies etc. It is known to the person skilled in the art, that such batteries may be used for any other suitable application.

Throughout the following description several terms will be used which are defined as follows:

- A balancing threshold voltage difference or $\Delta U$ is used to describe the width of a maximum tolerable voltage band in which the voltage of the cells should be. Thereby $\Delta U$ is defined by means of a multivariable function und equals to the tolerable potential difference regarding the cell with the lowest potential and regarding the cell with the highest potential.
- A cell voltage or $U_{cell[m]}$ describes the measured voltage of a cell m, whereby m is a positive integer.
- $U_{Cell\_corrected[m]}$ is a cell voltage of a cell m, which is correct by the influence of the internal resistance.
- $U_{low}$ designates the cell voltage of the lowest cell.
- $U_{max}$ describes the maximum acceptable voltage. $U_{max}$ is defined as the sum of $U_{low}$ and $\Delta U$ ($U_{max}=U_{low}+\Delta U$).
- I is used to describe a current.
- R[m] describes the internal resistance of cell m.

All cells of the battery are monitored by a battery monitoring system 31, shown in FIG. 3, in a continuous manner. The balancing circuit of the battery monitoring system is controlled by a method 10 as shown with a representation of method steps in the diagram of FIG. 1. The method 10 of the battery monitoring system 31 determines if a certain cell needs to be balanced or not. Said procedure runs during charging as well as during discharging of the battery, but the specific thresholds differ according to different battery and environmental conditions as described below. Said decision is a yes-no-decision for any of the monitored batteries and it is independent to the balancing method implemented. This method can be either a resistor in parallel to the cell or more sophisticated solutions like switched capacitors, switch-mode DC/DC-converters (active devices) and others. However, procedure 10 controls the balancing independent to the balancing method and comprises the following steps (the term 'voltage' or 'U' refers either to the measured voltage values or to the corrected values as described above):

a) Evaluate the cell that has the lowest voltage $U_{low}$, which is therefore designated as weakest cell. Step: get lowest cell. Reference numeral 11.
b) Determine a balancing threshold $\Delta U$ dependant on state of battery and other factors. As an example, $\Delta U$ defines a narrow voltage band during charge and gets even closer at the end of charge, whereas $\Delta U$ is higher during discharge, resulting in a wider voltage band. Step: Get balancing threshold. Reference numeral 12.
 To determine $\Delta U$ one or more possible calculation methods are possible.
 I. Chosen based on experience, for example 10% of the nominal voltage withing a state of charge between 10 and 90% of the nominal capacity and 3% between 90 and 100% or 0 and 10% of the state of charge.
 II. Chosen based on the speed of change in voltage, e.g. during discharge if the voltage drops faster, the voltage difference $\Delta U$ gets smaller and during charging if the voltage increases slower, then the voltage difference $\Delta U$ gets bigger. The relation can be linear (voltage change ration 0.1V/1 Ahr equals 10 mV).
 III. Chosen based on a constant charge difference. Balancing should start only if the charge difference in Ahr is bigger than 1% (or any other value within a range of 0 to 10%). As the correlation of battery voltage change over time and effective charge are given in the manufacturer charge/discharge curves, it is easy to calculate the value for $\Delta U$ offline. In a discharge (charge) curve where the battery voltage over capacity is given (over time can easily be converted by multiplying the time with the discharge current) one can determine the actual voltage of the battery for the given state of charge and then by increasing (decreasing) the capacity by the desired difference $\Delta Ahr$ read the resulting $\Delta U$.
 IV. Chosen based on the maximum time one would allow to equalize the cell. This depends on the discharge current capability of the balancing circuit (e.g. 200 mA or 2 A) and the maximum time within one would like to balance. If in 1 hour a balancing circuit with 200 mA should equalize the cell, the resulting maximum call imbalance should not exceed 200 mAhr. $\Delta U$ has to be calculated accordingly.
 V. Any combination of I.) to IV.)
c) Calculation of maximum allowable cell voltage (upper border of voltage band). Step: Umax=Voltage lowest cell+$\Delta U$. Reference numeral 13.
d) Start with the first cell. Step m=1. Reference numeral 14.
e) Loop through all cells of the system. Step: Do. Reference numeral 15 and 18
f) Comparison of every single cell voltage to the maximum allowable voltage. Step: Is $U_{cell[m]}>U_{max}$?. Reference numeral 16.
g) If $U_{cell[m]}>U_{max}$ is true then enable balancing. Step: Enable balancing of cell m. Reference numeral 17a.
h) If $U_{cell[m]}>U_{max}$ is false then disable balancing. Step: Disable balancing of cell m. Reference numeral 17b.
i) While m<number of cells go to step k). If m>=number of cells, start again with step a). Reference numeral 18.
k) Increment cell number. Step: m=m+1. Reference numeral 19 Return to step e)

As it can be seen from the diagram in FIG. 1 and from the description above these method steps 10 will be repeated continuously or intermittently for all the cells of the battery.

It has to be noted that, if all cells are in between the said voltage band, there is no balancing. The term maximum allowable cell voltage is defined to discern one or more cells, having already reached a certain cell voltage, while at least one cell stays behind in terms of voltage.

The term dependant on state of battery and other factors can comprise the actual state of charge of the weakest cell, the value of the charging current or the load current and the temperature of the cells. It has to be noted that above steps are also carried out when the cells are discharging. Other factors may the actual state of charge, voltage of the weakest and voltage of the highest cell, the value of the charging current or the load current and different further factors.

The calculation does take into consideration, that these factors will change the values of the voltage difference $\Delta U$ as calculated in point I) to V) on page 7. A temperature change of the battery will either increase or decrease the voltage per usable capacity change ratio. At lower temperature is the usable capacity much lower (typically 50% at −10° C. for Li-Poly Systems, other values for different Lithium based systems). As a consequence the voltage drop per imbalance charge quantity will vary also. This change can be directly calculated from charge/discharge curves from the manufacturer.

Over time (age) and number of cycles there is also a decrease of usable capacity, which again influences the ratio between voltage difference ΔU and the imbalance charge quantity It is also possible to run the method 10 in a different way. The loop 15, 16, 17, 18 and 19 is only effected for cells cell(m) near the upper end of the voltage band. A second slower monitoring circuit looks at the remaining usually uncritical cells and includes them in the method 10 according to FIG. 1 only if their value is approaching the upper or lower voltage band. Otherwise the monitoring voltage check is effected in a slower rhythm.

Generally, the lowest voltage $U_{low}$ is determined without considering the internal resistance of the battery. However, it is also possible that the internal resistance of the cell will be taken into account as described above.

The balancing threshold ΔU is a result of weighted calculations of state of operation (charge or discharge), state of charge (fully charged, fully discharged, partially discharged or partially charged), temperature and age (state of health). Basically, the balancing threshold ΔU is proportional to a certain amount of imbalance. If this imbalance increases beyond the acceptable level, balancing circuit gets active to reduce this charge imbalance.

It is noted that during the operation of the balancing circuit the steps according to FIG. 1 are still executed continuously or intermittently, to decide, when to stop the balancing, i.e. when after completion of all decisions 16 to 18, there is no cell anymore with a cell voltage above said maximum allowable voltage. This is especially the case, if the charge imbalance has been reduced by the balancing circuit.

FIG. 2 shows an arrangement to measure the internal resistance of a battery 1 according to the present invention. The internal resistance is thereby measured online, which means during charging/discharging of the battery.

Thereby the system to determine the internal resistance according to the present invention comprises an element for difference calculation 21, an element for resistance calculation 22, an element for small signal correction 23, a low pass filter 24 and an offset correction 25. The element for signal correction discards results, which were received from the element for resistance calculation 22, at small currents. This to avoid calculation errors, which may occur at small signals. The offset correction 25 cancels the difference between short- and long term measurements. Its value equals the slow electrochemical part of the internal resistance.

Thereby the voltage of each cell is monitored and the current is measured as well. The current is measured as a mean to protect the battery. With the difference of these two parameters it is possible by means of ohms law to determine the internal resistance. Thereby the voltage drop over the specific cell is divided by the current variation. This means that the internal resistance may be determined under normal operation conditions during charge as well as during discharge. This is a big advantage over prior art, because no external components are needed and measurements can be carried out without stopping the device.

If the current variations are very small, it is possible that noise could affect the result in a severe way. To prevent such measurement resolution errors, advanced filtering methods are used and the measurements at low signal values will be discarded. The measurement should therefore only be made when the current variations are big enough. However, this small signal correction does not filter all non ideal calculations. A low pass filter 24 avoids too big steps of the value of internal resistance, which occur when the calculation is made at a not ideal sampling point.

The method is shown in FIG. 2. In normal DC measurement the voltage reading is done slightly after the current pulse to compensate for dynamic effects. Therefore it is necessary in the proposed solution to compensate this dynamic effect by applying a correction factor for the resistance. This correction factor can be calculated based on previous offline measurement and manufacturer data. Furthermore, it is a function of the age of the battery. The resulting internal resistance shows to be close to the value measured with the DC measurement method without the negative effects of the prior art.

The measurement of the internal resistance is very important for assessing the battery in terms of state of health or age (SOH Algorithms). If one or multiple cells have an increased internal resistance in contrast to the average internal resistance, they are considered as 'weak cells'. Since the performance of the whole battery pack is determined by the weakest cell, it is vital to replace these cells before they affect the performance in a very negative way. The results from the internal resistance calculation 20 allow such an early detection of weak cells.

FIG. 3 shows an arrangement of a cell voltage correction 30 according to the present invention comprising a regular battery management system 31, an element to calculate the voltage drop over internal resistance 32.

The result of method 30 is a corrected voltage which is independent of the current and which is proportional to the charge of the cell. Basically, it is the voltage 'inside' the cell, without the effects from the internal resistance and the connection resistance.

Such values are of big significance for all voltage based algorithm and thresholds like balancing, end of charge, end of discharge and others.

The invention claimed is:

1. A device for balancing a plurality of at least two cells of a multicell battery comprising:
   a battery monitoring system having a balancing circuit; and
   a multicell battery having individual battery cells, wherein all individual battery cells are connected to the battery monitoring system,
   wherein the battery monitoring system measures every single cell voltage and discerns the cell having the lowest cell voltage and discerns a number of cells having a voltage higher than a determined maximum allowable voltage, and
   wherein the battery monitoring system generates a control signal for the balancing circuit to allow balancing of the cells if a voltage difference between the cell having the lowest cell voltage and the cells having a voltage higher than the determined maximum allowable voltage is greater than a predetermined threshold.

2. The device according to claim 1, wherein the battery monitoring system monitors every individual cell continuously and during at least one of charge and discharge.

3. The device according to claim 1, wherein the battery monitoring system determines the predetermined threshold as a function of the state of the multicell battery, an operational state (charge/discharge), a multicell battery temperature and the current flowing through the battery or the individual cells.

4. The device according to claim 1, wherein a method used by the battery monitoring system comprising the following steps:
- determining a balancing threshold, dependant on a state of the multicell battery (charge or discharge current) and one or more other factors from the group comprising: an actual state of charge, voltage of a weakest and voltage of a highest cell, a value of charging current or load current, a maximum balancing current, a maximum balancing time, a temperature, an age and number of cycles of the multicell battery;
- evaluating the cell that has the lowest cell voltage;
- calculating the maximum allowable cell voltage, which is an upper border of voltage band by adding a balancing threshold to the voltage of the lowest cell;
- comparing a cell voltage of every single cell to the maximum allowable cell voltage;
- comparing the cell voltage of every single cell to the minimum threshold value; and
- storing/transmitting balancing information of specific cell and enable balancing, if the voltage of said cell exceeds said threshold value.

5. The device according to claim 1, wherein the battery monitoring system comprises an internal resistance calculation unit to determine an internal resistance of every cell.

6. The device according to claim 5, wherein a value of the internal resistance improves voltage based transitions and cell voltage correction.

7. The device according to claim 1, wherein the balancing circuit is controlled by a variable threshold voltage, thereby keeping a cell imbalance in a determined, variable voltage band.

* * * * *

UNITED STATES PATENT AND TRADEMARK OFFICE
CERTIFICATE OF CORRECTION

PATENT NO. : 8,120,321 B2
APPLICATION NO. : 12/161872
DATED : February 21, 2012
INVENTOR(S) : Andrea Vezzini et al.

It is certified that error appears in the above-identified patent and that said Letters Patent is hereby corrected as shown below:

Face of the Patent, Column 1, Item (75) Inventors, Line 2, delete "Bronnimann," and insert
-- Brönnimann, --

Signed and Sealed this
Eighth Day of May, 2012

David J. Kappos
*Director of the United States Patent and Trademark Office*